Patented Dec. 8, 1953

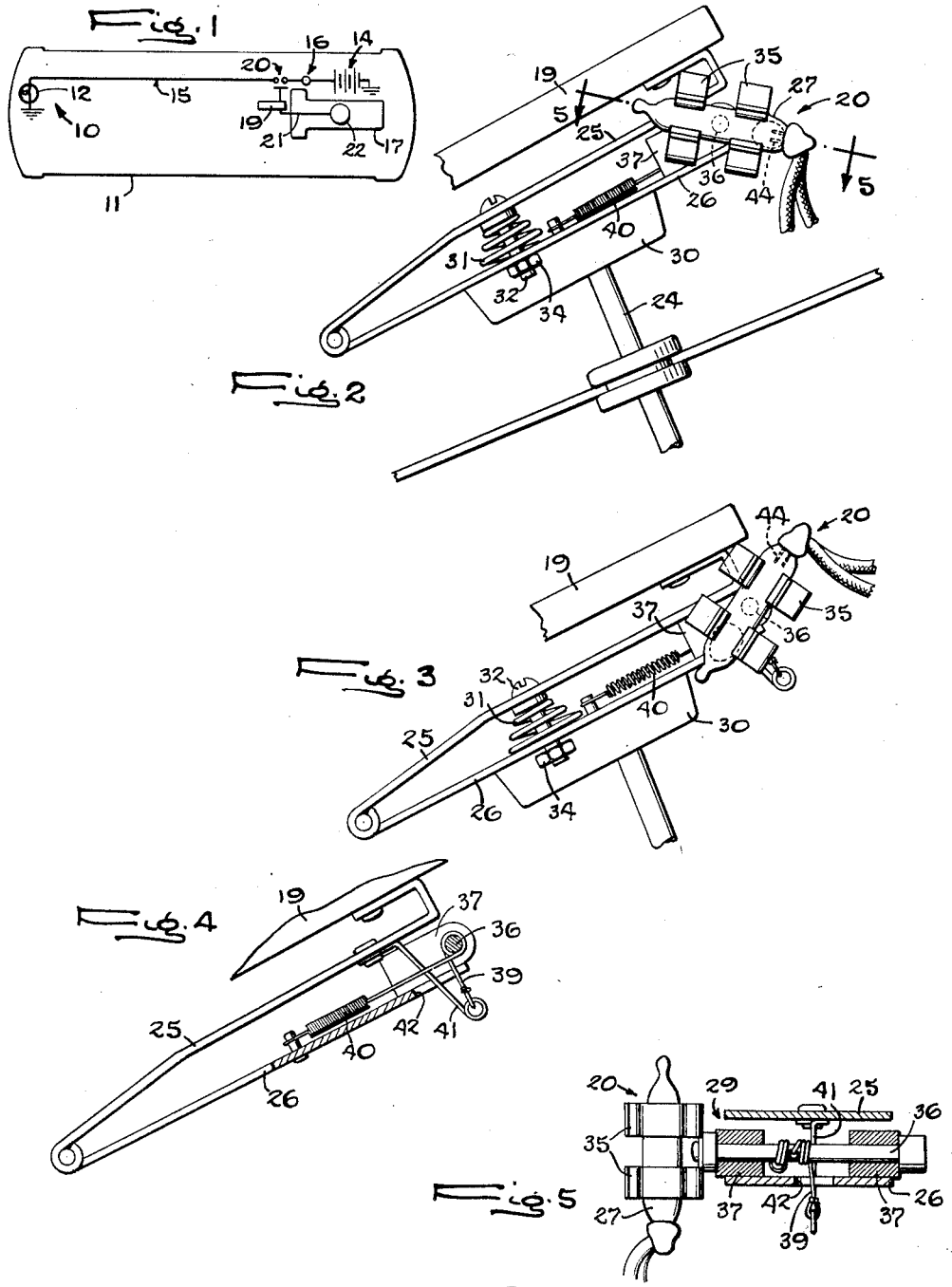

2,662,132

UNITED STATES PATENT OFFICE 2,662,132

ACCELERATOR CONTROLLED VEHICLE WARNING LIGHT

John T. Crowe, Chicago, Ill., and Carl E. Seaberg, Gardena, Calif.

Application April 16, 1952, Serial No. 282,546

6 Claims. (Cl. 200—61.89)

1

The present invention relates to improvements in signal means for use in motor vehicles to automatically warn following motorists on the highway when such vehicles are being checked in speed.

One of the current hazards of highway driving is the ever present possibility that the deceleration of a moving vehicle will result in collisions involving trailing motorists who are not adequately forewarned of the decrease in speed of the leading vehicle. Accidents of this character generally occur after one motorist has been trailing another at the same general speed, and the perilous situations leading to such accidents usually arise in either of two ways. If two vehicles are traveling at relatively high speeds spaced a considerable distance apart, there is a likelihood that the operator of the second vehicle may not become aware of a slowing down of the leading vehicle in instances in which the speed reduction of the latter is caused by engine friction after closing of the vehicle throttle and not by an application of the brakes which would flash a warning by the brake lights. As a consequence, the following motorist may rapidly overtake the decelerating vehicle before he becomes aware of the rapid closing of the spacing between the vehicles. It is then oftentimes too late to avert an accident. A somewhat similar situation can arise when two closely spaced vehicles are moving along together, even at a relatively slow speed. Should there be a sudden application of brakes by the leading driver, the trailing driver may not be warned in ample time by the brake lights of the forward vehicle to check the speed of his own vehicle and avoid a collision.

Taking into account the above mentioned hazards encountered in the operation of motor vehicles, it is the general aim of the invention to provide an improved warning system for a conventional motor vehicle which is responsive to the removal of pressure from the vehicle accelerator pedal to emit a signal to trailing motorists that the vehicle is being slowed, even though the brakes are not applied; the warning system, in practice, being operative in any event to emit a warning signal which precedes the application of pressure to the foot brake by a time increment at least equal to the time required by the operator to shift his foot from the accelerator to the brake pedal.

One object of the invention is to provide an improved signaling system of the above character having a novel control device of a relatively simple, economical construction which is especially adapted to be conveniently incorporated

2 into the accelerator linkage of a conventional motor vehicle without any substantial modification of the structural elements of the linkage.

Another object is to provide for a motor vehicle signal system of the above character a novel, quick-response control device which is sensitive to the application of foot pressure to the accelerator pedal of a motor vehicle, or to the removal of pressure therefrom to respectively de-energize or energize the signal system prior to the change in the vehicle speed or even the adjustment of the engine throttle setting ensuing from the change in foot pressure on the accelerator. A subsidiary object is to provide a signal switch device which is not subject to deterioration by prolonged hard service and which is operable in response to a nominal relative movement of the actuating members of the switch.

A further object is to provide an improved signal system of the type described which is so constructed and arranged that its operation is not adversely affected by wear or looseness of the accelerator linkage of the motor vehicle on which the system is installed or by displacement of the accelerator linkage as a consequence of carburetor adjustments.

Other objects and advantages will become apparent as the description proceeds.

In the accompanying drawings:

Figure 1 is a schematic sectional view of a motor vehicle equipped with one embodiment of the invention.

Fig. 2 is a fragmentary side view, partially in section, showing on an enlarged scale a novel signal control device incorporated into the accelerator linkage of a motor vehicle, as taught by the invention, component elements of the device being illustrated in their relative positions assumed when fuel feeding pressure is removed from the accelerator.

Fig. 3 is a fragmentary side view similar to the upper portion of Fig. 2 but showing the relative position of the working elements of the control device after fuel feeding pressure is applied to the accelerator.

Fig. 4 is a fragmentary longitudinal sectional view of the signal control device of Figs. 2 and 3.

Fig. 5 is a sectional view taken generally along line 5—5 of Fig. 2, but with the elongated switching capsule assumed to be rotated into a position midway between its circuit opening and circuit closing positions.

Although certain advantages and added features of utility are realized from the specific correlation and arrangement of mechanical structure comprising the illustrated embodiment of the invention, it will be understood that the invention is not limited to the exact form shown, but embraces all equivalent constructions within the spirit and scope of the invention, as expressed in the appended claims.

Referring in greater detail to the drawings, a warning system 10, constituting the exemplary form of the invention, is incorporated into a conventional motor vehicle 11, shown diagrammatically in Fig. 1. For purposes of illustration, this system comprises a warning light 12 adapted to be mounted on a rearward portion of the vehicle and energized by the vehicle battery 14 by means of a power circuit 15 connected in series with the ignition switch 16 for the engine 17. When the vehicle is in operation with the switch 16 closed, the warning light 12 is controlled as an incident to the application to and the removal from the vehicle accelerator pedal 19 to fuel feeding foot pressure by the operator. This is accomplished by means of a novel pressure responsive control switch 20 electrically connected in series with the control circuit 15 and mechanically interposed between coacting motion transmitting elements of the accelerator linkage 21 conventionally used to control the throttle setting of the carburetor 22. The switch 20 thus constitutes, in effect, a coupling through which fuel feeding foot pressure is transmitted from the accelerator pedal 19 to succeeding mechanical linkage leading to the carburetor 22.

As an incident to acting as a component element of the accelerator linkage 21, the control switch 20 selectively energizes the warning circuit 15 in accordance with the application to and the removal from the accelerator pedal 19 of fuel feeding foot pressure independently of the instant positional relationship of coacting accelerator links. Consequently, the control switch arrangement thus provided is capable of effecting almost instantaneous energization of the warning circuit 15 in response to the removal of fuel feeding foot pressure by the operator from the accelerator pedal 19 even before the accelerator linkage 21 has sprung back to throttle closing position. The promptness with which a warning signal is emitted is of particular advantage in close, heavy traffic in which a sudden stop by a vehicle would be likely to precipitate a collision with a trailing vehicle. The signal flashed by the warning system 10 immediately upon the removal of foot pressure from the accelerator pedal 19 alerts the trailing motorist to an impending change in vehicle speed even before the leading driver has shifted his foot to the brake pedal.

Although the time interval between the energization of the warning light 12 and the energization of the conventional brake lights (not shown) of the vehicle 11 in the case of a sudden stop may be short, it can well be sufficient to avert an accident. In this connection, it will, moreover, be appreciated that the distance traversed by a motorist in "responding" to a danger signal may approximate that traversed after the brakes are fully applied. Thus, the preliminary signal provided by the invention, by alerting the mind of the trailing motorist, stirs him to make a quicker response to a slowing of the leading vehicle, thereby reducing the distance required for checking the speed of the trailing vehicle.

The use of a pressure responsive control switch 20 in the accelerator linkage 21, whereby the switch becomes a mechanical coupling in the linkage, gives rise to other worth-while operational advantages of the warning system 10, as will presently appear, and also adapts the system as a whole for convenient installation in motor vehicles already in use.

The preferred form of the switch 20 shown in detail in Figs. 2 to 5, is designed to be interposed between the underside of the conventional accelerator pedal 19 and the accelerator push rod 24 which is conventionally articulated directly with the accelerator pedal. Structurally, the control switch 20 is of a unique design wherein two electrical contacts spaced widely apart to prevent arcing are closed and opened electrically in response to virtually inconsequential movement of the accelerator pedal 19 in relation to succeeding elements of the accelerator linkage 21 on the opposite side of the switch. In this manner, a quick responsive, pressure sensitive control of the warning system 10 is achieved without introducing appreciable "slack" into the accelerator linkage 21.

In the present instance, the control switch 20 comprises a pair of hinged elongated plates 25, 26 arranged to have slight scissoring movement toward and from each other according to the incidence of fuel feeding pressure on the accelerator pedal 19. This scissoring movement, even though of very slight degree, is utilized to tumble an encapsulated mercury switch unit 27, connected in series with the warning circuit 15, selectively into circuit opening and closing positions. The upper switch plate 25 is adapted to be attached to the underside of the accelerator pedal 19 in slightly spaced, parallel relation thereto by means of suitable bolts, spacers, and the like. The end of the upper plate 25, hinged to the lower plate 26, is bent slightly downwardly out of the plane of the main portion of the upper plate to offset the lower plate in spaced, generally parallel relation to the top plate. Coacting structural units of the switch are mounted in the spacing between the plates and include abutment means 29 fixed to one of the two plates (in this instance the lower plate 26) in position to engage an opposed portion of the other plate for positively limiting scissoring movement of the plates toward each other.

In this manner, the switch 20 forms a force transmitting coupling between the accelerator pedal 19 and the push rod 29, which coupling is completed by a rubber socket 30 fixed to the underside of the lower plate 26 to receive the free end of the accelerator push rod 24. It will be perceived that upon the application of foot pressure to the accelerator pedal 19 bringing the upper switch plate into engagement with the abutment means 29, the control switch 20, in effect, becomes "solid" with the pedal for actuating the push rod 24.

Upon the removal of foot pressure from the accelerator pedal 19 the switch plates 25, 26 are scissored away from each other slightly by a compression spring 31 acting between the plates. As shown, the spring 31 is helical in form and is disposed between the two plates 25, 26 to be held in place by a transverse bolt 32 fixed to the upper plate 25 and extending downwardly through the spring. The lower end of the bolt 32 projects through lower plate 26 and is fitted with an enlarged abutment 34 (in this instance a threaded nut) which limits spreading movement of the two plates 25, 26 to a predetermined small angle.

The elongated mercury switch unit 27, which is rocked between reversely inclined positions in response to reverse scissoring movement of the plates 25, 26 is mounted in a double clip 35 fixed to one end of a pivot shaft 36 journaled in the abutment means 29. To assure sturdiness in the shaft support, the abutment means 29 is fashioned as twin lugs 37 disposed in spaced relation to each other and formed with alined bores to receive the shaft.

Movements of the upper switch plate 25 relative to the lower switch plate 26 are transmitted to the pivot shaft 36 by means of a flexible line 39. The bight of the line 39 is fixed to the shaft 36 between the twin abutment journals 37. One adjacent end of the line is wound at least one turn around the shaft 36 and secured to a helical spring 40 anchored to the lower plate 26. The spring 40 is tensioned to bias the shaft 36 about its axis for swinging the elongated mercury switch capsule 27 into the circuit closing, inclined position illustrated in Fig. 2. The other extreme end of the line 39 is wound about the shaft 36 in a direction opposite to the winding of the first end of the line and is secured to the lower end of an actuating leg 41 depending from the upper plate 25 and extending through a clearance opening 42 in the lower plate 26. With this arrangement downward movement of the leg 41 relative to the lower plate 26, as an incident to scissoring of the two plates 25, 26 toward each other overcomes the spring 40 and rotates the mercury capsule 27 to the circuit opening, inclined position illustrated in Fig. 3.

The mercury switch capsule 27 itself is of a commercially available construction. It is equipped at one end with a pair of contact points 44 and encloses a bead of mercury freely movable from one end of the capsule to the other. As the capsule 27 is incorporated into the switch structure described, the contacts 44 in one end of the capsule are, when swung into lowered circuit closing position, Fig. 2, bridged by the mercury bead. When the capsule is swung back into circuit opening position, Fig. 3, the mercury bead drains away from the contacts 44 which are spaced apart sufficiently to prevent arcing.

The control switch arrangement thus provided is eminently well suited for the special purpose intended. The switch contacts are not subject to deterioration by the frequent opening and closing of the warning circuit 15. Moreover, the lasting qualities of the switch and its most desirable switching action are achieved without introducing any appreciable slack into the accelerator linkage.

The use of a fuel feeding pressure responsive signal control switch organization, as taught by the invention, gives rise to further operational advantages in that the switching action is not adversely affected by displacements in the "throttle closed" position of the accelerator linkage 21 caused by wear on the linkage itself, by carburetor adjustments, or by partial opening of the throttle by the throttle hand control (not shown).

A warning system of the type described is well adapted for easy installation in motor vehicles already in use. The warning light 10 can be mounted on the rear of the vehicle and the switch control 20 can be readily attached to the acceleration pedal 19 to coact with the accelerator push rod 24 without any special skill. Completion of the rudimentary electrical control circuit 15 is a simple wiring job.

If desired, replacement accelerator pedals complete with the switch control 20 attached can be provided for substitution in place of conventional accelerator pedals already in use.

We claim as our invention:

1. A warning light switch control adapted for insertion in the accelerator linkage of a motor vehicle to form a mechanical coupling therein and being responsive to the application to and the removal from the linkage of throttle opening force to open and close a warning circuit, said switch comprising, in combination, two relatively movable switch actuating members, the first of said members being adapted to be connected to an actuating element of an accelerator linkage, the second of said members being adapted to be connected to the succeeding actuated element of the linkage, abutment means on said members for limiting relative movement of the members toward each other, thereby enabling said members to positively transmit force between the adjacent actuating element and the actuated element of said linkage, resilient means interconnected between said two members for urging the latter apart from each other, second coacting abutment means on said members for limiting spreading movement of the members by said resilient means, a circuit opening and closing unit interconnected with said two members and responsive to reverse movement of the latter relative to each other to open and close a warning circuit.

2. A warning light switch control adapted for insertion in the accelerator linkage of a motor vehicle to form a mechanical coupling therein and to become responsive to the application to and the removal from the linkage of throttle opening force to open and close a warniing circuit, said switch comprising, in combination, two relatively movable switch actuating members, the first of said members being adapted to be connected to an actuating element of the vehicle accelerator linkage, the second of said members being adapted to be connected to the succeeding actuated element of the linkage, abutment means on said members for limiting relative movement of the members toward each other, whereby said members are enabled to positively transmit throttle opening force between the adjacent actuating element and the actuated element of said linkage, resilient means interconnected between said two members and urging the latter apart from each other, second abutment means on said members for limiting spreading movement of the members by said resilient means, a tiltable mercury-type circuit making and breaking unit, pivotal means on said switch supporting said unit, and mechanical actuating means interconnected with said support means and said members and operable to produce reverse tilting of said unit in response to reverse movement of said members relative to each other.

3. A switch control for a motor vehicle warning system of the class described and comprising, in combination, two companion plates hinged to each other for relative scissoring movement, a first one of said plates being adapted for attachment to the fuel feeding accelerator pedal of a motor vehicle, the second of said plates being adapted for attachment to the succeeding element of the accelerator linkage of the vehicle, motion-limiting means on said plates for limiting scissoring movement of the latter toward each other, thus enabling the switch control to serve as a mechanical coupling operable to positively transmit motion of the accelerator pedal to the succeeding accelerator linkage, resilient means interconnected between said plates and urging the latter from each other, second abutment means on said plates arranged to limit to a small angle opening scissoring movement of said plates under influence of said resilient means, a tiltable mercury-type circuit making and breaking unit, pivotal shaft means journaled on one of said plates and supporting said unit, a flexible line wound about said shaft and interconnected with the other of said plates and operable to rotate said shaft and unit into circuit breaking position as an incident to scissoring of said plates toward each other, and spring means interconnected with said line and operable to rotate said shaft and unit to circuit making position as an incident to scissoring of said plates away from each other.

4. A switch control for an automotive vehicle warning system of the class described and comprising, in combination, two coacting members mutually interconnected for relative movement toward and away from each other, the first of said members being adapted for attachment to the vehicle accelerator pedal, the second of said members being adapted for attachment to the succeeding element of the vehicle accelerator linkage, motion-limiting means on said members for limiting movement of the latter toward each other, thus enabling the switch control to serve as a mechanical coupling operable to positively transmit motion of the accelerator pedal to the succeeding accelerator linkage, resilient means interconnecting between said members and biasing the latter from each other, second abutment means on said members arranged to limit to a small increment separating movement of said members under influence of said springs, a tiltable mercury-type circuit making and breaking unit, pivotal support means on one of said members supporting said unit, and operating means interconnected between said support means and the other of said support means for reversely pivoting the latter and said unit as an incident to reverse relative movement of said members.

5. A switch control for an automotive vehicle warning system of the class described and comprising, in combination, two coacting members mutually interconnected for relative movement toward and away from each other, the first of said members being adapted for attachment to the vehicle accelerator pedal, the second of said members being adapted for attachment to the succeeding element of the vehicle accelerator linkage, motion-limiting means on said members for limiting movement of the latter toward each other, thus enabling the switch control to serve as a mechanical coupling operable to positively transmit motion of the accelerator pedal to the succeeding accelerator linkage, resilient means interconnected between said members and biasing the latter from each other, second abutment means on said members arranged to limit to a small increment separating movement of said members under influence of said springs, and circuit making and breaking means interconnected between said members and operative to selectively open and close an electrical warning circuit in response to reverse relative movement of said members.

6. A warning light switch control adapted for insertion in series in the accelerator linkage of a motor vehicle which linkage transmits force in one direction for opening the throttle of the vehicle and upon release of said force closes said throttle, comprising, in combination, a pair of actuating members mounted for relative movement toward and from each other, said actuating members being adapted for connection to respective ones of a pair of succeeding elements of the accelerator linkage in interposed relation therebetween, a switch unit adapted to open and close an electric circuit upon relative swinging movement, a mounting for said switch unit on one of said actuating members, means interconnecting said switch unit with the other of said actuating members for swinging said switch unit to closed position upon relative movement of said actuating members in one direction and to open position upon relative movement in the opposite direction, resilient means for moving said actuating members relative to each other in the opposite direction upon release of the transmitted force in the accelerator linkage, and abutment means for limiting the relative movement of said actuating members to an amount sufficient to operate said switch unit.

JOHN T. CROWE.
CARL E. SEABERG.

References Cited in the file of this patent
UNITED STATES PATENTS

| Number | Name | Date |
|---|---|---|
| 2,197,553 | Larson | Apr. 16, 1940 |
| 2,301,583 | Roderick | Nov. 10, 1942 |
| 2,301,584 | Roderick | Nov. 10, 1942 |